(12) United States Patent
Hori et al.

(10) Patent No.: US 10,943,473 B2
(45) Date of Patent: Mar. 9, 2021

(54) INFORMATION MANAGEMENT APPARATUS AND NON-TRANSITORY COMPUTER-READABLE RECORDING MEDIUM RECORDING PROGRAM

(71) Applicant: TOYOTA JIDOSHA KABUSHIKI KAISHA, Toyota (JP)

(72) Inventors: Takashige Hori, Aisai (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/145,889

(22) Filed: Sep. 28, 2018

(65) Prior Publication Data

US 2019/0130735 A1 May 2, 2019

(30) Foreign Application Priority Data

Oct. 26, 2017 (JP) .............................. JP2017-207477

(51) Int. Cl.
  *G08G 1/01* (2006.01)
  *G07C 5/00* (2006.01)
  *G08G 1/017* (2006.01)

(52) U.S. Cl.
  CPC ........... *G08G 1/0112* (2013.01); *G07C 5/008* (2013.01); *G08G 1/017* (2013.01)

(58) Field of Classification Search
  CPC ....... G08G 1/0112; G08G 1/017; G07C 5/008
  See application file for complete search history.

(56) References Cited

U.S. PATENT DOCUMENTS

| 2008/0091339 A1 | 4/2008 | Nagase et al. |
| 2010/0198454 A1 | 8/2010 | Sugawara et al. |
| 2018/0225962 A1* | 8/2018 | Nakamura ............. G08G 1/127 |

FOREIGN PATENT DOCUMENTS

| CN | 101162551 A | 4/2008 |
| CN | 101681495 A | 3/2010 |
| JP | 2012-248107 A | 12/2012 |
| WO | 2017/037784 A1 | 3/2017 |

* cited by examiner

*Primary Examiner* — Michael D Lang
(74) *Attorney, Agent, or Firm* — Hunton Andrews Kurth LLP (57) ABSTRACT

An information management apparatus and a non-transitory computer-readable recording medium recording a program which is executable by an information management apparatus is disclosed. The information management apparatus includes: a memory which is configured to store vehicle information; processing circuitry configured to receive the vehicle information and to store the vehicle information in the memory, the vehicle information including vehicle identification information uploaded from each of a plurality of vehicles managed by the information management apparatus, analyze the vehicle information stored in the memory according to a set analysis viewpoint, and change an upload condition of the vehicle information based on an analysis result of the vehicle information; and a transmitter configured to transmit the changed upload condition to a vehicle among the plurality of vehicles.

7 Claims, 9 Drawing Sheets

| VEHICLE IDENTIFICATION INFORMATION | VEHICLE TYPE INFORMATION | TIME SLOT INFORMATION | AREA INFORMATION | VEHICLE INFORMATION |
|---|---|---|---|---|
| . . . . . | . . . . . | . . . . . | . . . . . | . . . . . |
| . . . . . | . . . . . | . . . . . | . . . . . | . . . . . |
| . . . . . | . . . . . | . . . . . | . . . . . | . . . . . |
| . . . . . | . . . . . | . . . . . | . . . . . | . . . . . |

TA

VEHICLE INFORMATION: POSITION INFORMATION, ORIENTATION INFORMATION, VEHICLE SPEED AND ACCELERATION INFORMATION, ···

| AREA VIEWPOINT V1 | UPLOAD CONDITION IS NOT CHANGED |
| | THE NUMBER OF TIMES OF SAMPLINGS IN UPLOAD IS CHANGED |
| | UPLOAD IS CEASED |
| TIME SLOT VIEWPOINT V2 | UPLOAD CONDITION IS NOT CHANGED |
| | THE NUMBER OF TIMES OF SAMPLINGS IN UPLOAD IS CHANGED |
| | UPLOAD IS CEASED |
| VEHICLE TYPE VIEWPOINT V3 | UPLOAD CONDITION IS NOT CHANGED |
| | THE NUMBER OF TIMES OF SAMPLINGS IN UPLOAD IS CHANGED |
| | UPLOAD IS CEASED |
| INFORMATION ITEM VIEWPOINT V4 | UPLOAD CONDITION IS NOT CHANGED |
| | THE NUMBER OF TIMES OF SAMPLINGS IN UPLOAD IS CHANGED |
| | UPLOAD IS CEASED |

INFORMATION MANAGEMENT APPARATUS AND NON-TRANSITORY COMPUTER-READABLE RECORDING MEDIUM RECORDING PROGRAM

INCORPORATION BY REFERENCE

The disclosure of Japanese Patent Application No. 2017-207477 filed on Oct. 26, 2017 including the specification, drawings and abstract is incorporated herein by reference in its entirety.

BACKGROUND

1. Technical Field

The disclosure relates to an information management apparatus and a non-transitory computer-readable recording medium recording a program.

2. Description of Related Art

A system that uploads information (hereinafter collectively referred to as "vehicle information") acquired by each vehicle, such as a vehicle position, a vehicle speed, and a vehicle orientation, to a processing server at an appropriate timing, and provides a service using vehicle information in the processing server, is known (for example, refer to Japanese Unexamined Patent Application Publication No. 2012-248107 (JP 2012-248107 A). In the system disclosed in JP 2012-248107 A, vehicle information (probe traffic information) acquired by an in-vehicle device is uploaded to a processing server in real time when the vehicle stops. Based on the probe traffic information transmitted when the vehicle stops, the processing server estimates the vehicle behavior or the like and performs a real time traffic congestion detection.

SUMMARY

With the technology disclosed in JP 2012-248107 A, a real time traffic congestion detection is possible. However, there is a problem, for example, that in a case where probe traffic information in the same area is already sufficiently obtained from many vehicles, a transmission of the probe traffic information from all vehicles without any restriction causes a processing server overload due to processing the probe traffic information, and communication traffic significantly increases.

The disclosure provides an information management apparatus and a non-transitory computer-readable recording medium recording a program, which enables reduction of a processing load and communication traffic of vehicle information acquired by each vehicle.

A first aspect of the disclosure provides an information management apparatus including: a memory which is configured to store vehicle information; processing circuitry configured to receive the vehicle information and to store the vehicle information in the memory, the vehicle information including vehicle identification information uploaded from each of a plurality of vehicles managed by the information management apparatus, analyze the vehicle information stored in the memory according to a set analysis viewpoint, and change an upload condition of the vehicle information based on an analysis result of the vehicle information; and a transmitter configured to transmit the changed upload condition to a vehicle among the plurality of vehicles.

A second aspect of the disclosure provides a non-transitory computer-readable recording medium recording a program which is executable by an information management apparatus including a memory which stores vehicle information. When executed by the information management apparatus, the program causes the information management apparatus to realize functions of receiving the vehicle information including vehicle identification information uploaded from each of a plurality of vehicles managed by the information management apparatus, analyzing the vehicle information stored in the memory according to a set analysis viewpoint, changing an upload condition of the vehicle information based on an analysis result of the analyzing of the vehicle information, and transmitting the changed upload condition to a vehicle among the plurality of vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings. In the following description, the same elements are denoted by the same reference numerals, and redundant description is omitted.

A. Embodiment

A-1. Configuration

Figure 1:
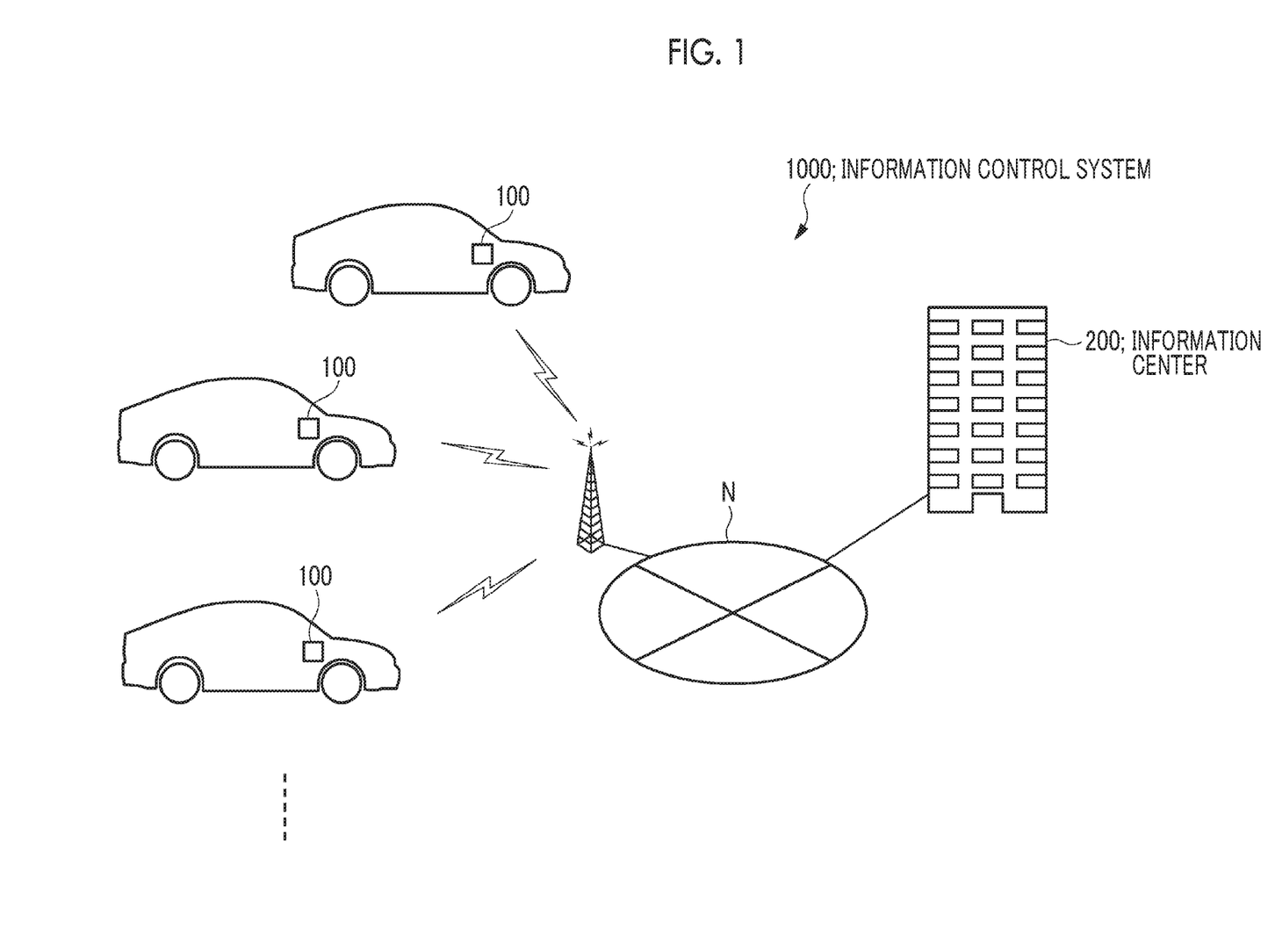
FIG. 1 is a diagram showing a schematic configuration of an information control system according to an embodiment.

FIG. 1 is a diagram showing a schematic configuration of an information control system 1000 according to an embodiment. The information control system 1000 shown in FIG. 1 is configured to include a vehicle information communication apparatus 100 installed on each user's vehicle managed by the information management apparatus, and an information center 200 analyzing vehicle information uploaded (transmitted) from each vehicle information communication apparatus 100, and providing an instruction to change an upload condition or the like to each vehicle information communication apparatus 100 based on an analysis result.

Each vehicle information communication apparatus 100 and the information center 200 are mutually communicable via a communication network N. The communication network N may be, for example, any one of an Internet, a local area network (LAN), a dedicated line, a telephone line, a corporate intranet, a mobile communication network, Bluetooth (registered trademark), Wireless Fidelity (WiFi), other communication lines, and a combination of these examples, and may be wired or wireless.

Vehicle Information Communication Apparatus 100

Figure 2:
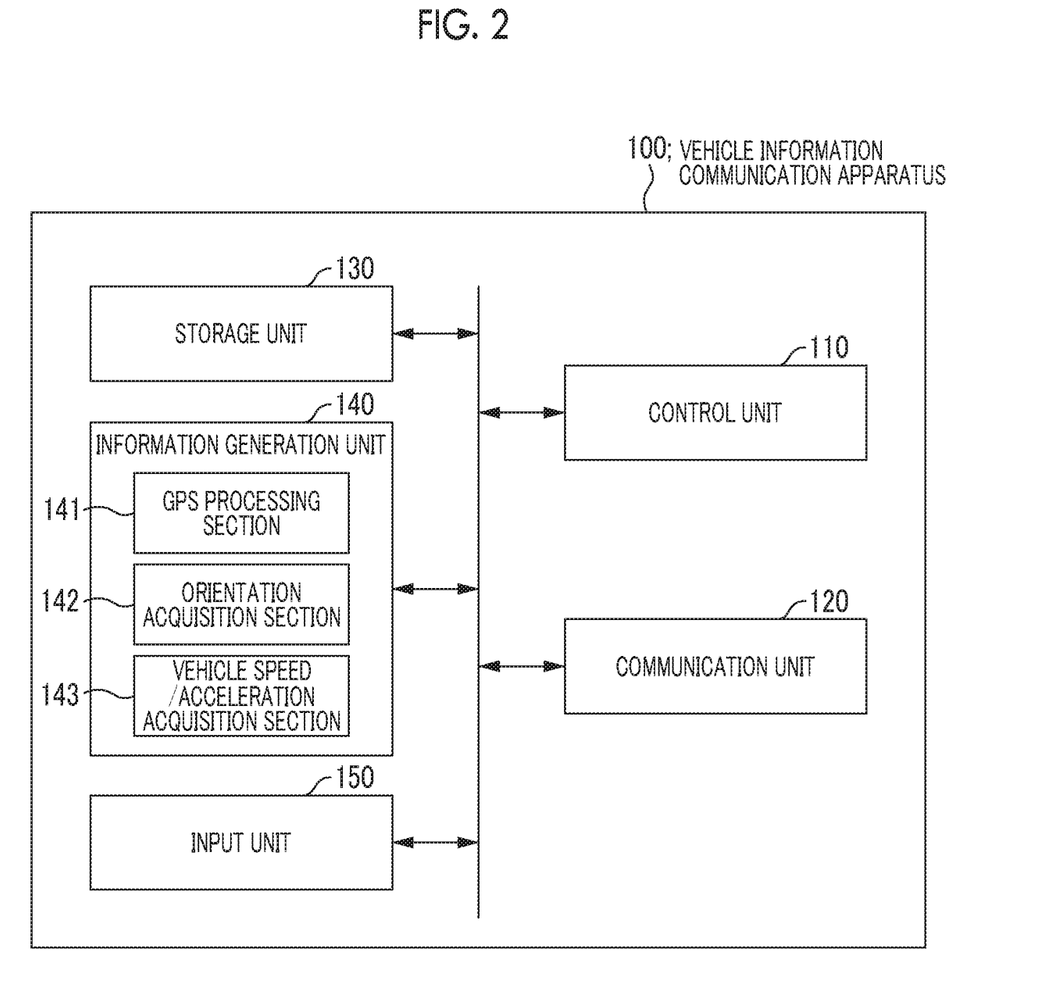
FIG. 2 is a block diagram showing a configuration of a vehicle information communication apparatus.

FIG. 2 is a block diagram showing a configuration of the vehicle information communication apparatus 100.

The vehicle information communication apparatus 100 is, for example, a car navigation apparatus installed in each vehicle, and is configured to include a control unit 110, a communication unit 120, a storage unit 130, an information generation unit 140, and an input unit 150.

The control unit 110 includes a micro control unit (MCU) having, as main components, a central processing unit (CPU), a read only memory (ROM), a random access memory (RAM) and the like, and executes various programs or the like stored in the ROM or the RAM so as to execute comprehensive control on each unit of the vehicle information communication apparatus 100.

The communication unit 120 has a communication interface complying with various communication standards, and transmits and receives data to and from an external device such as the information center 200, a portable terminal (not shown) possessed by a user, or the like via the communication network N. Examples of the portable terminal include a smartphone, a mobile phone, a personal digital assistant (PDA), a tablet terminal, a personal computer (PC), and a laptop PC.

The storage unit 130 is configured to include a recording medium such as a hard disk, a semiconductor memory, or the like, and a drive device of the recording medium. Programs, data, or the like, which is needed for the control unit 110 to execute comprehensive control on the vehicle information communication apparatus 100, are stored in the storage unit 130 in an updatable format. The vehicle information generated by the information generation unit 140, and information (hereinafter also referred to as "upload condition information") providing an instruction to change the upload condition transmitted from the information center 200 are stored in the storage unit 130.

The information generation unit 140 generates various pieces of information representing the state of the vehicle (that is, vehicle information), such as vehicle position, a vehicle speed, a vehicle orientation, and the like, which is controlled by the control unit 110. The information generation unit 140 includes a GPS processing section 141, an orientation acquisition section 142, a vehicle speed/acceleration acquisition section 143, and the like.

The GPS processing section 141 acquires position information representing the current position (latitude and longitude, etc.) of the vehicle by using information transmitted from the global positioning system (GPS) satellite. The orientation acquisition section 142 acquires orientation information indicating the vehicle orientation based on information obtained from an orientation sensor (not shown) or the like. The vehicle speed/acceleration acquisition section 143 acquires the vehicle speed and acceleration information indicating vehicle speed and acceleration based on information obtained from a vehicle speed sensor, an acceleration sensor (none of which are shown), or the like.

Upon generating the vehicle information including the position information representing the current position of the vehicle, the orientation information indicating the vehicle orientation, and the vehicle speed and acceleration information representing the vehicle speed and acceleration, the information generation unit 140 adds vehicle identification information for uniquely specifying the vehicle to the generated vehicle information, and transmits the resultant information to the information center 200. Each vehicle information communication apparatus 100 performs, when using the information control system 1000 for the first time, an initial registration by transmitting vehicle type information representing a vehicle type of the vehicle together with the vehicle identification information to the information center 200 (details will be described later).

The input unit 150 is configured to include an operation device including an operation key, an operation button, and a touch sensor, a microphone, or the like.

Information Center 200

Figure 3:
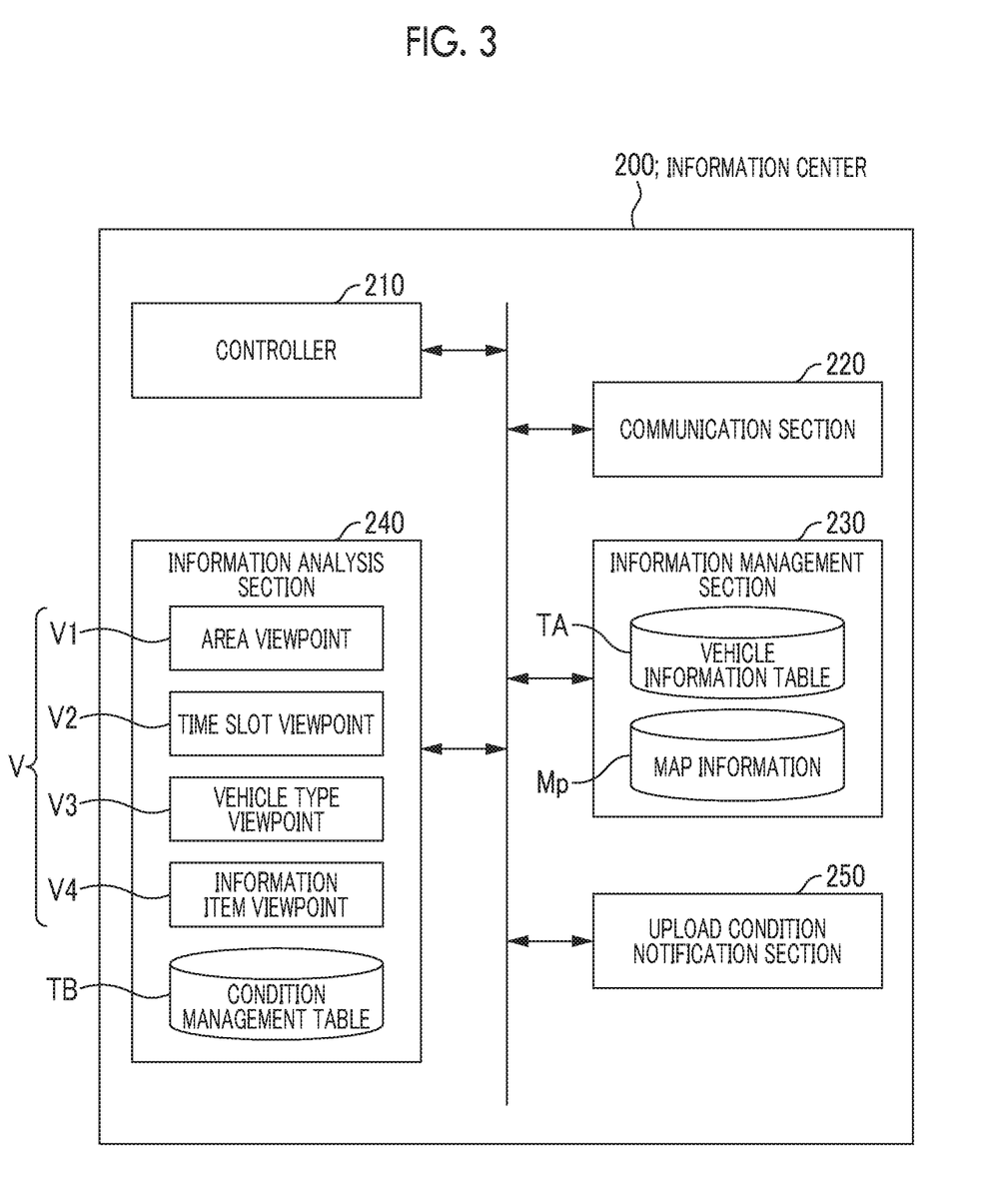
FIG. 3 is a block diagram showing a functional configuration of an information center.

The information center 200 includes, for example, a computer having a high calculation processing capability, and has a function of accumulating and managing the vehicle information uploaded from each vehicle information communication apparatus 100, a function of analyzing the vehicle information, and a function of providing an instruction to change the upload condition of each vehicle information communication apparatus 100 or the like. The computer constituting the information center 200 is not necessarily a single computer, and may include a plurality of computers distributed over the communication network N.

FIG. 3 is a block diagram showing a functional configuration of the information center 200. The information center 200 is configured to include a controller 210, a communication section 220, an information management section 230, an information analysis section 240, and an upload condition notification section 250. The controller 210 is configured to include an arithmetic logic unit (CPU or the like) for processing arithmetic operation, logical operation, bit operation, or the like, and storage means such as the ROM and the RAM. The controller 210 executes central control on each section of the information center 200 by executing various programs stored in the storage means such as the ROM or the like.

The communication section 220 includes a communication interface complying with various communication standards, receives vehicle information uploaded from each vehicle information communication apparatus 100 via the communication network N, and transmits the upload condition information generated in the upload condition notification section 250 to each vehicle information communication apparatus 100. The communication section 220 exchanges various pieces of information with external devices including each vehicle information communication apparatus 100.

Figure 4A:
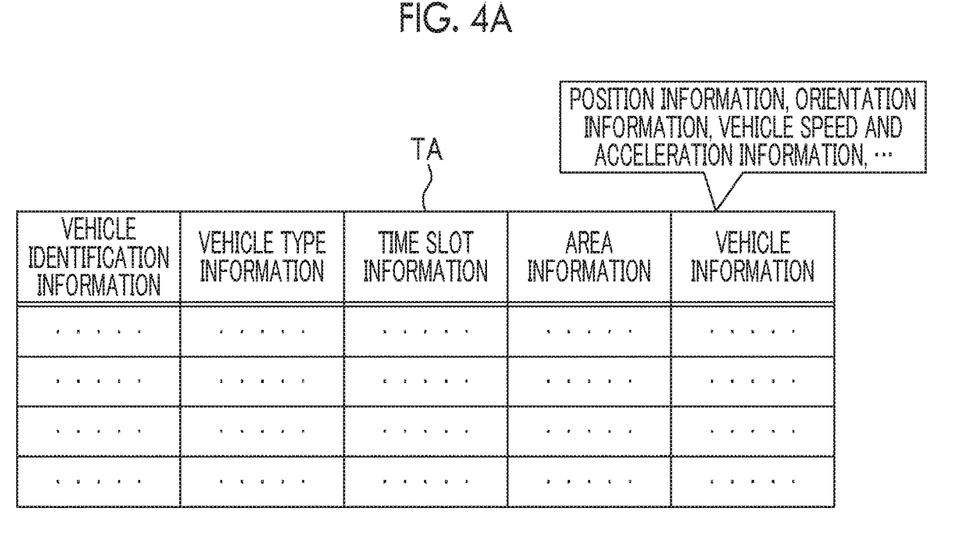
FIG. 4A is a diagram showing registered contents of a vehicle information table.

The information management section (memory) 230 accumulates and manages the vehicle information uploaded from each vehicle information communication apparatus 100. FIG. 4A is a diagram showing a vehicle information table TA stored in the information management section 230.

In the vehicle information table TA, for each vehicle, vehicle identification information for uniquely identifying the vehicle, vehicle type information for specifying the vehicle type (for example, vehicle name OX, or manufactured by OOO), time slot information for specifying the time slot (for example, 10:00 to 11:00, or the like) in which the vehicle information is transmitted, area information for specifying the area where the vehicle is present, and the vehicle information are registered in association with each other. As described above, the vehicle identification information and the vehicle type information are pieces of information initially registered. In particular, each vehicle information communication apparatus 100 transmits, when using the system for the first time, the vehicle identification information and the vehicle type information needed for initial setting to the information center 200. Upon receiving unique pieces of the vehicle identification information and the vehicle type information from the vehicle information communication apparatus 100, the information management section 230 of the information center 200 registers the vehicle identification information and the vehicle type information, which have been received, in the vehicle information table TA in association with each other.

Upon receiving the vehicle information to which the vehicle identification information is added from the vehicle information communication apparatus 100 after the initial setting is executed, the information management section 230 searches for the vehicle information table TA with the vehicle identification information as a search key to uniquely specify the vehicle and the vehicle type. The information management section 230 also registers the received vehicle information in the vehicle information table TA in association with the vehicle identification information and the vehicle type information of the specified vehicle.

The information management section 230 figures out the time (for example, mm-dd-yy, 00:00) when receiving the vehicle information using a timer or the like, obtains the time slot information based on the received time of the vehicle information which is figured out, and registers the information in the vehicle information table TA. The information management section 230 compares the position information representing the current position (latitude and longitude, or the like) of the vehicle included in the vehicle information with the map information Mp of the area covered by the information center 200 so as to obtain an area code of an area in which the vehicle is located. The area code is, for example, a unique number (for example, area k (k≥2)) assigned to each area per regional unit such as town or street. After obtaining the area code, the information management section 230 registers the obtained area code in the vehicle information table TA as area information.

The vehicle information includes various information items such as the position information indicating the current position of the vehicle, the orientation information indicating the vehicle orientation, and the vehicle speed and acceleration information indicating the vehicle speed and acceleration. "Information item" means each piece of information constituting the vehicle information, and in the following description, is supposed to be four information items which are the vehicle position information, the vehicle orientation information, the vehicle speed and acceleration information. The type and the number of information items can be appropriately set and changed by an operator or the like of the system.

Figure 4B:
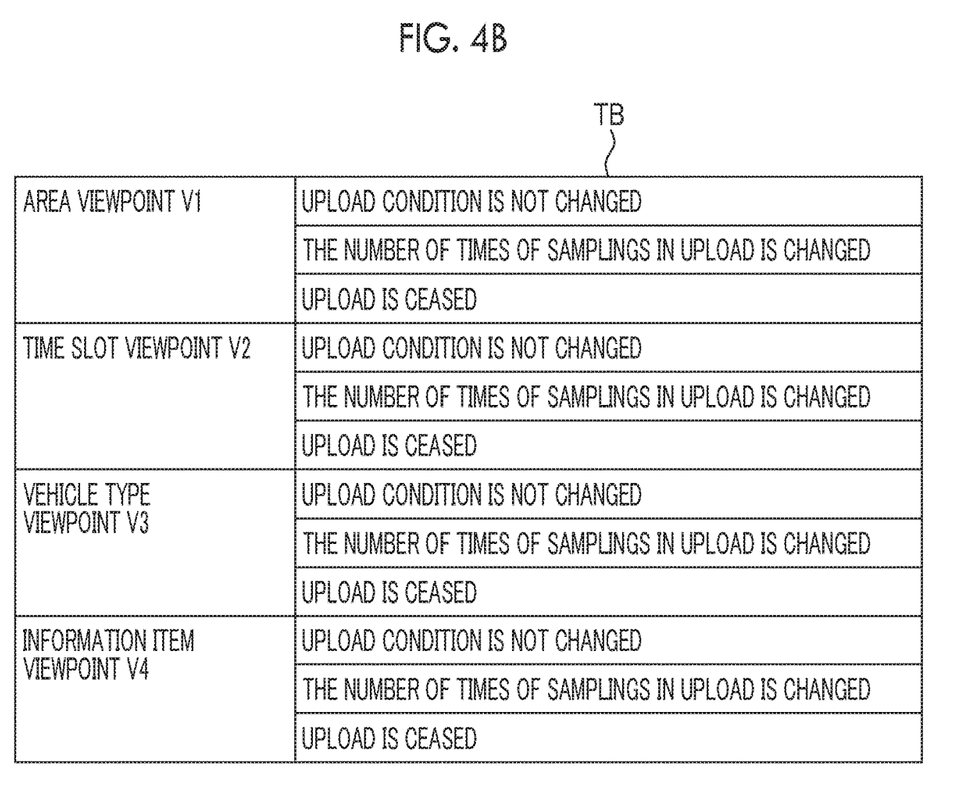
FIG. 4B is a diagram showing registered contents of a condition management table.

The information analysis section 240 analyzes a plurality of pieces of vehicle information accumulated in the information management section 230 in accordance with a plurality of analysis viewpoints V, using a condition management table TB, and notifies the upload condition notification section 250 of the analysis result. As shown in FIG. 3, in the embodiment, four analysis viewpoints, that is, an area viewpoint V1 for analyzing and managing the vehicle information per area, a time slot viewpoint V2 for analyzing and managing the vehicle information per time slot, a vehicle type viewpoint V3 for analyzing and managing the vehicle information per vehicle type, and an information item viewpoint V4 for analyzing and managing the vehicle information per information item, are set as the analysis viewpoints V. FIG. 4B is a diagram showing an example of the condition management table TB defining each analysis viewpoint V and the upload condition. In the embodiment, three types of the upload conditions are defined for each analysis viewpoint V. In particular, the following conditions are defined for each of the area viewpoint V1, the time slot viewpoint V2, the vehicle type viewpoint V3, and the information item viewpoint V4: (1) the upload condition of the vehicle information is not changed, (2) the upload condition of the vehicle information is changed to a condition for reducing the number of times of samplings, and (3) the upload condition of the vehicle information is changed to a condition for ceasing the upload. Details of the conditions shown in (1) to (3) and details of information analyses based on each analysis viewpoint will be described below.

The upload condition notification section 250 generates the upload condition information providing the instruction to change the upload condition of each vehicle information communication apparatus 100 based on the analysis result of the vehicle information provided from the information analysis section 240, and sends the generated information to the communication section 220. The communication section 220 transmits, which is controlled by the controller 210, the upload condition information sent from the upload condition notification section 250 to each vehicle information communication apparatus 100 and provides the instruction to change the upload condition. Each vehicle information communication apparatus 100 changes the upload condition of the vehicle information according to upload condition information.

Hereinafter, the operation of changing the upload condition by the information center 200 will be described in detail.

A-2. Operation

Operation of Changing Upload Condition Per Area; Area Viewpoint V1

Figure 5:
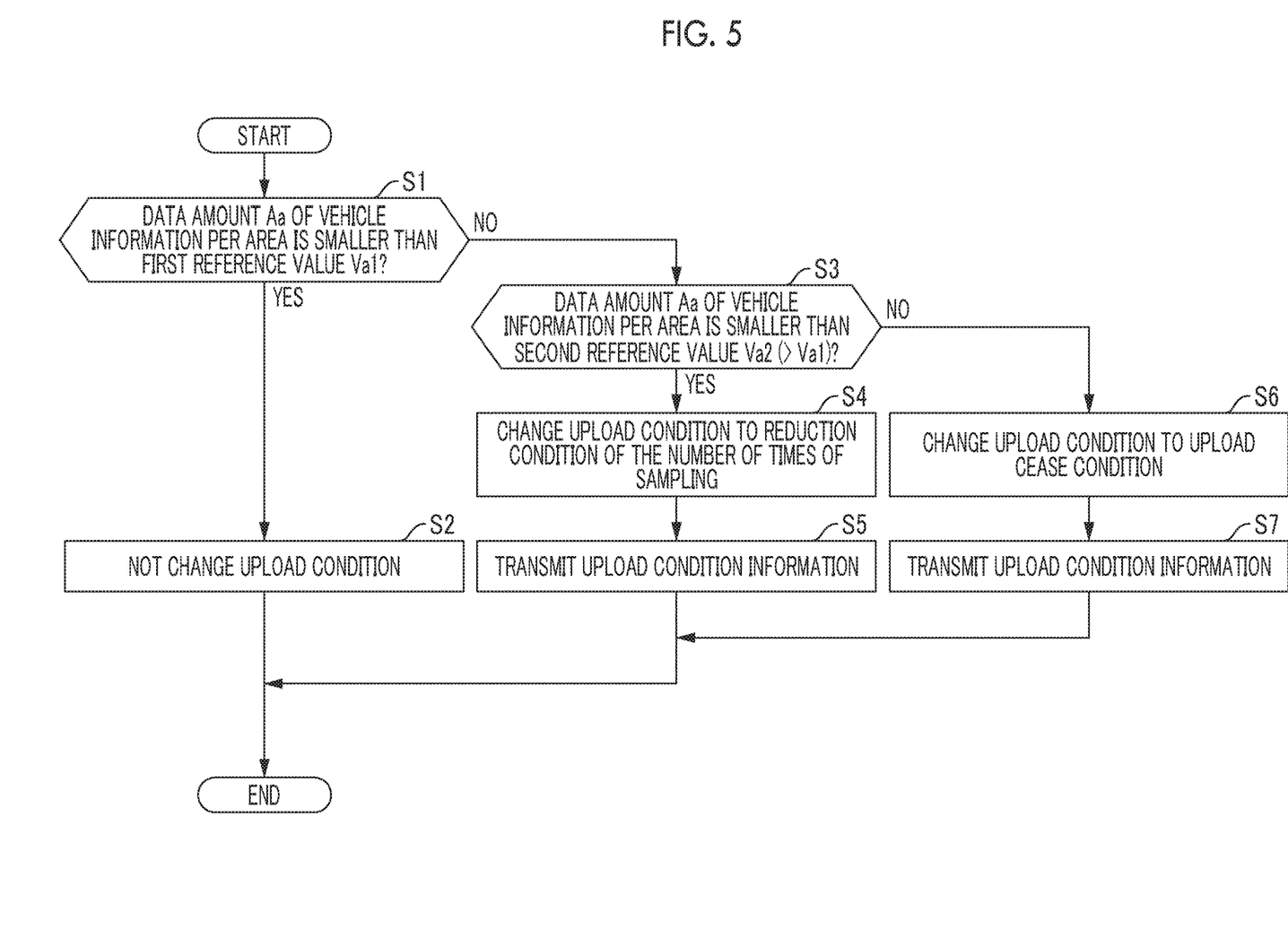
FIG. 5 is a flowchart showing an operation of changing an upload condition per area.
Figure 6:
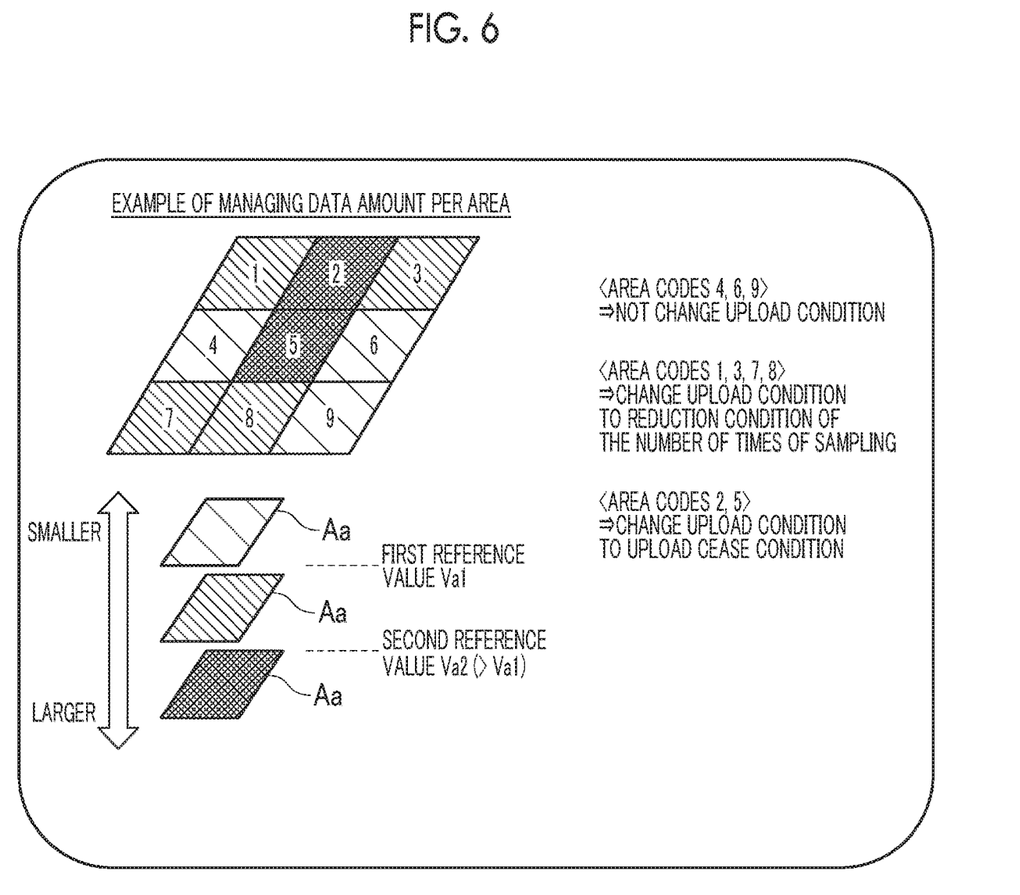
FIG. 6 is a descriptive diagram in a case of changing the upload condition per area.

FIG. 5 is a flowchart showing a processing of changing the upload condition per area, which is executed by the information center 200. FIG. 6 is a descriptive diagram in a case of changing the upload condition per area. In the following description, it is assumed that setting has been made to upload the vehicle information to all the vehicle information communication apparatuses 100 without restriction as the initial setting.

In the case of changing the upload condition per area, the information analysis section 240 figures out the collected vehicle information for each area code referring to the vehicle information table TA based on the area viewpoint V1, and executes the following processing for each area code by using the condition management table TB.

The information analysis section 240 determines whether or not data amount Aa of the collected vehicle information per area is smaller than a first reference value Va1 (step S1). The first reference value Va1 is a reference value for determining whether or not the upload condition currently set in each vehicle information communication apparatus 100 is to be changed. For example, the first reference value Va1 can be appropriately set and changed by the operator or the like of the system.

In a case where the data amount Aa of the collected vehicle information per area is smaller than the first reference value Va1 (step S1; YES), the information analysis section 240 determines that there is no need to change the upload condition, and notifies the upload condition notification section 250 of the analysis result that the upload condition is not to be changed (that is, the currently set upload condition is maintained). More specifically, for example, the data amount Aa of the vehicle information is smaller than the first reference value Va1 for the area codes 4, 6, 9 out of the area codes 1 to 9 shown in FIG. 6. Therefore, the information analysis section 240 notifies the upload condition notification section 250 of the analysis result that the upload condition is not to be changed.

The upload condition notification section 250 determines that there is no need to generate the upload condition information based on the analysis result notified from information analysis section 240 (step S2), and ends the processing.

On the other hand, in a case where the data amount Aa of the collected vehicle information per area is equal to or larger than the first reference value Va1 (step S1; NO), the information analysis section 240 determines that there is a need to change the upload condition, and the processing proceeds to step S3. In step S3, the information analysis section 240 determines whether or not the data amount Aa of the collected vehicle information per area is smaller than a second reference value Va2 (>Va1) (step S3). The second reference value Va2 is a reference value for determining the changing content of the upload condition currently set in each vehicle information communication apparatus 100, and for example, can be appropriately set and changed by the operator or the like of the system. In the embodiment, as the changing content of the upload condition, the following upload conditions are defined: a condition where the number of times of the sampling of the vehicle information is reduced to decrease the data amount of uploaded vehicle information (hereinafter also referred to as "reduction condition of the number of times of sampling"), and a condition where the upload is ceased (hereinafter also referred to as "upload cease condition"). In particular, in a case where the data amount Aa of the vehicle information per area satisfies the following Expression (1), the upload condition is changed to the reduction condition of the number of times of sampling. The method of setting the number of times of sampling is freely selectable. For example, the number of times of sampling per unit time may be set directly, alternatively, the time slot of sampling or the like may be set.

$$Va1 \leq Aa < Va2 \quad (1)$$

On the other hand, in a case where the data amount Aa of the vehicle information per area satisfies the following Expression (2), the upload condition is changed to the upload cease condition.

$$Va2 \leq Aa \quad (2)$$

Upon determining that the data amount Aa of the collected vehicle information per area is smaller than the second reference value Va2 (step S3; YES), the information analysis section 240 notifies the upload condition notification section 250 of the analysis result that the upload condition is to be changed to the reduction condition of the number of times of sampling. More specifically, the data amount Aa of the vehicle information is smaller than the second reference value Va2 for the area codes 1, 3, 7, 8 out of the area codes 1 to 9 shown in FIG. 6. Therefore, the information analysis section 240 notifies the upload condition notification section 250 of the analysis result that the upload condition is to be changed to the reduction condition of the number of times of sampling for the vehicles located in areas indicated by the area codes 1, 3, 7, 8.

The upload condition notification section 250 specifies the vehicles located in the areas indicated by the area codes 1, 3, 7, 8, generates the upload condition information that the upload condition is to be changed to reduction condition of the number of times of sampling for the vehicle information communication apparatus 100 of the vehicle (step S4), and sends the generated information to the communication section 220. The communication section 220 reads vehicle identification information I1 of the vehicle information communication apparatus 100 located in the areas indicated by one of the area codes 1, 3, 7, 8 from the vehicle information table TA. The communication section 220 adds the vehicle identification information I1 of the vehicle information communication apparatus 100 located in the area indicated by one of the area codes 1, 3, 7, 8 to the generated upload condition information, transmits the resultant information (step S5), and ends the processing.

On the other hand, upon determining that the data amount Aa of the collected vehicle information per area is equal to or larger than the second reference value Va2 (step S3; NO), the information analysis section 240 notifies the upload condition notification section 250 of the analysis result that the upload condition is to be changed to the upload cease condition (step S5). In particular, the data amount Aa of the vehicle information exceeds the second reference value Va2 for the area codes 2, 5 out of the area codes 1 to 9 shown in FIG. 6. That is, the vehicle information is already sufficiently obtained. Therefore, the information analysis section 240 notifies the upload condition notification section 250 of the analysis result that the upload condition is to be changed to the upload cease condition for the vehicles located in the area indicated by the area codes 2, 5.

The upload condition notification section 250 specifies the vehicle located in the areas indicated by the area codes 2, 5, generates the upload condition information that the upload condition is to be changed to the upload cease condition for the vehicle information communication apparatus 100 of the vehicle (step S6), and sends the generated information to the communication section 220. The communication section 220 reads the vehicle identification information I1 of the vehicle information communication apparatus 100 located in the area indicated by one of the area codes 2, 5 from the vehicle information table TA. The communication section 220 adds the vehicle identification information I1 of the vehicle information communication apparatus 100 located in the area indicated by one of the area codes 2, 5 to the generated upload condition information, transmits the resultant information (step S7), and ends the processing.

As described above, according to the example stated above, the data amount of the vehicle information is monitored per area. Determination is made on whether or not the upload condition of the vehicle information is maintained without a change (a necessity of the upload), the number of times of the sampling is reduced to decrease the data amount of the vehicle information, or the upload is ceased to significantly decrease the data amount of the vehicle information in accordance with the data amount of the collected vehicle information. As described above, the vehicle information is not unnecessarily uploaded from each vehicle information communication apparatus 100 to the information center 200, and the processing load and communication traffic of the vehicle information acquired by each vehicle can be reduced compared with the related art.

All of the vehicle information (as described above, the position information, the orientation information, the vehicle speed and acceleration information, or the like) may be uploaded in accordance with the upload condition, and a part of the vehicle information may be uploaded in accordance with the upload condition. For example, the vehicle speed and acceleration information among various pieces of information included in the vehicle information may be uploaded in accordance with the upload condition. Determination on whether or not the upload regulation is applied on any information included in the vehicle information can be appropriately set and changed by the operator or the like of the system.

Operation of Changing Upload Condition Per Time Slot; Time Slot Viewpoint V2

The case of changing the upload condition per area has been described; however, the upload condition may be changed per time slot (00:00 to 1:00, 1:00 to 2:00, . . . , 23:00 to 24:00, or the like).

Figure 7:
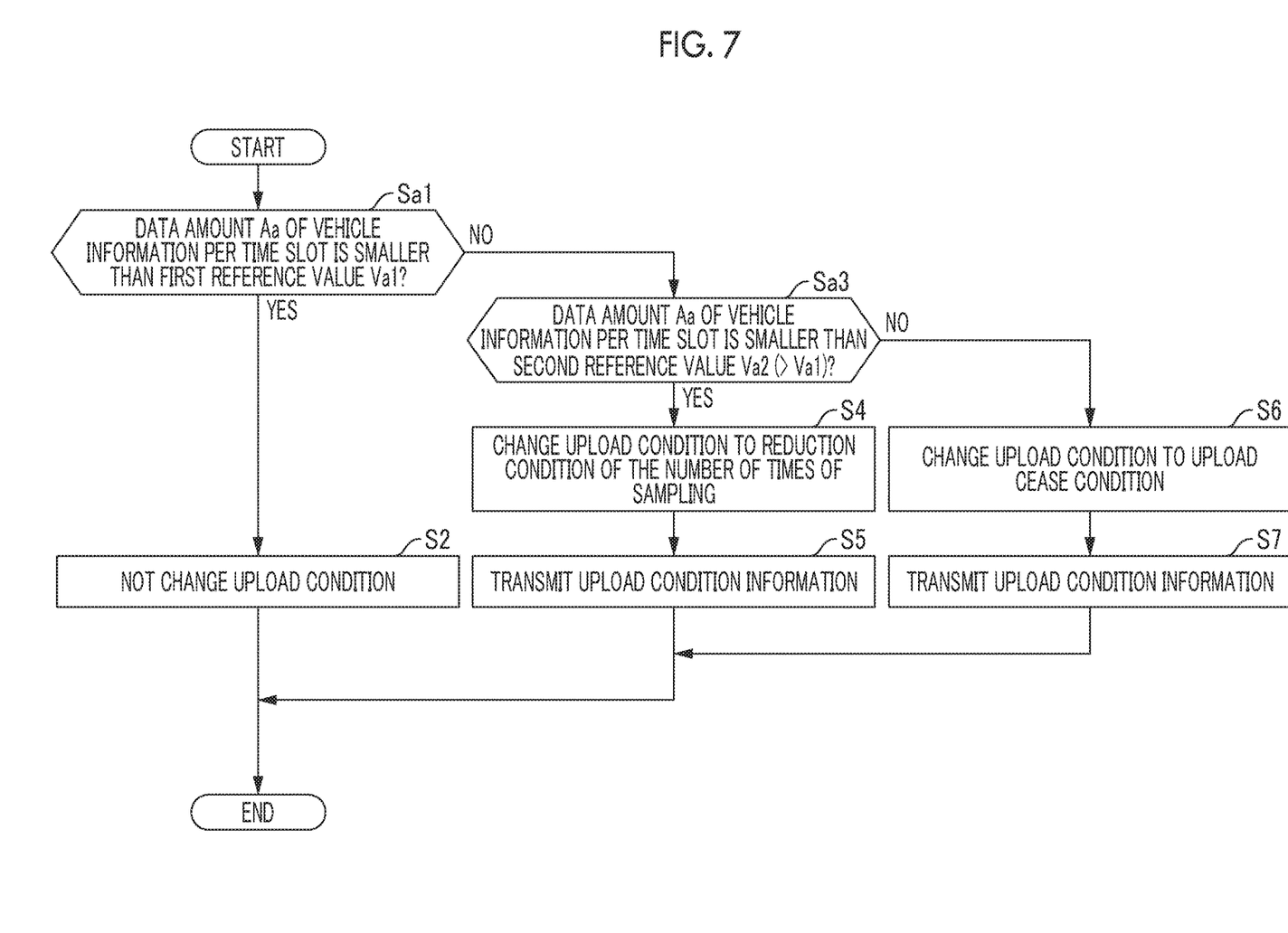
FIG. 7 is a flowchart showing an operation of changing the upload condition per time slot.

FIG. 7 is a flowchart showing a processing of changing upload condition per time slot, which is executed by the information center 200. Among the steps shown in FIG. 7, the same reference signs and numerals are given to steps respectively corresponding to steps shown in FIG. 5, and detailed descriptions thereof will be omitted.

In the case of changing the upload condition per time slot, the information analysis section 240 figures out the collected vehicle information for each time slot referring to the vehicle information table TA based on the time slot viewpoint V2, and executes the following processing for each time slot by using the condition management table TB.

The information analysis section 240 determines whether or not data amount Aa of the collected vehicle information per time slot is smaller than the first reference value Va1 (step Sa1). In a case where the data amount Aa of the collected vehicle information per time slot is equal to or larger than the first reference value Va1 (step Sa1; NO), the information analysis section 240 determines that there is a need to change the upload condition, and the processing proceeds to step Sa3. In step Sa3, the information analysis section 240 determines whether or not the data amount Aa of the collected vehicle information per time slot is smaller than the second reference value Va2 (>Va1) (step Sa3). Operations other than step Sa1 and step Sa3 can be described in the same manner as in FIG. 5, and thus the descriptions thereof will be omitted.

Operation of Changing Upload Condition Per Vehicle Type; Vehicle Type Viewpoint V3

Instead of changing the upload condition per time slot, for example, the upload condition may be changed per vehicle type.

Figure 8:
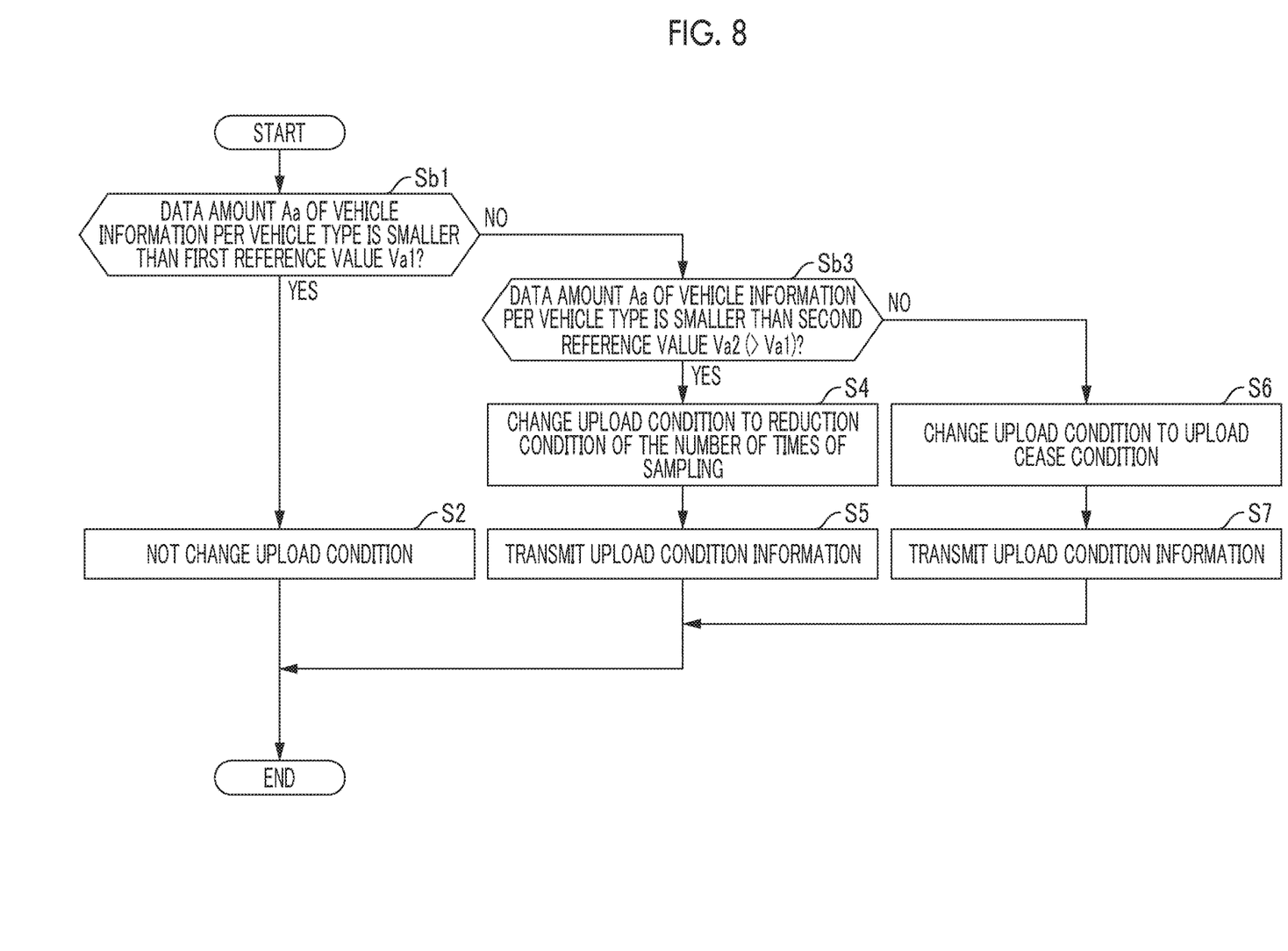
FIG. 8 is a flowchart showing an operation of changing the upload condition per vehicle type.

FIG. 8 is a flowchart showing a processing of changing the upload condition per vehicle type, which is executed by the information center 200. Among the steps shown in FIG. 8, the same reference signs and numerals are given to steps respectively corresponding to steps shown in FIG. 5, and detailed descriptions thereof will be omitted.

In the case of changing the upload condition per vehicle type, the information analysis section 240 figures out the collected vehicle information for each vehicle type referring to the vehicle information table TA based on the vehicle type viewpoint V3, and executes the following processing for each vehicle type by using the condition management table TB.

The information analysis section 240 determines whether or not data amount Aa of the collected vehicle information per vehicle type is smaller than the first reference value Va1 (step Sb1). In a case where the data amount Aa of the collected vehicle information per vehicle type is equal to or larger than the first reference value Va1 (step Sb1; NO), the information analysis section 240 determines that there is a need to change the upload condition, and the processing proceeds to step Sb3. In step Sb3, the information analysis section 240 determines whether or not the data amount Aa of the collected vehicle information per vehicle type is smaller than the second reference value Va2 (>Va1) (step Sb3). Operations other than step Sb1 and step Sb3 can be described in the same manner as in FIG. 5, and thus the descriptions thereof will be omitted.

Operation of Changing Upload Condition Per Information Item; Information Item Viewpoint V4

Instead of changing the upload condition per vehicle type, for example, the upload condition may be changed per information item.

Figure 9:
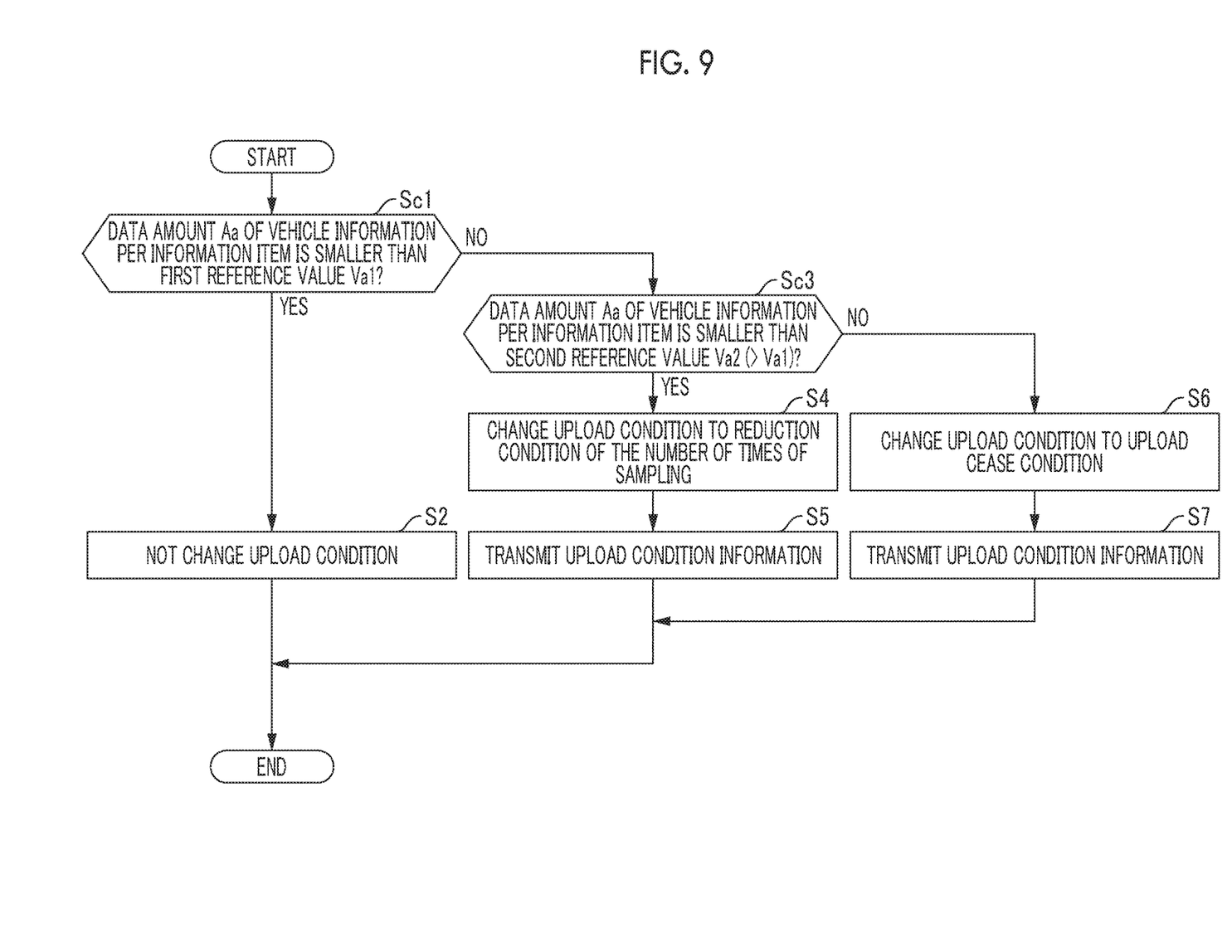
FIG. 9 is a flowchart showing an operation of changing the upload condition per information item.

FIG. 9 is a flowchart showing a processing of changing the upload condition per information item, which is executed by the information center 200. Among the steps shown in FIG. 9, the same reference signs and numerals are given to steps respectively corresponding to steps shown in FIG. 5, and detailed descriptions thereof will be omitted. As described above, the "information item" means each piece of information constituting the vehicle information (for example, the vehicle position information, the vehicle orientation information, the vehicle speed and acceleration information).

In the case of changing the upload condition per information item, the information analysis section 240 figures out the collected vehicle information for each information item referring to the vehicle information table TA based on the information item viewpoint V4, and executes the following processing for each information item by using the condition management table TB.

The information analysis section 240 determines whether or not data amount Aa of the collected vehicle information per information item is smaller than the first reference value Va1 (step Sc1). In a case where the data amount Aa of the collected vehicle information per information item is equal to or larger than the first reference value Va1 (step Sc1; NO), the information analysis section 240 determines that there is a need to change the upload condition, and the processing proceeds to step Sc3. In step Sc3, the information analysis section 240 determines whether or not the data amount Aa of the collected vehicle information per information item is smaller than the second reference value Va2 (>Va1) (step Sc3). Operations other than step Sc1 and step Sc3 can be described in the same manner as in FIG. 5, and thus the descriptions thereof will be omitted.

B. Others

The disclosure is not limited to the aforementioned embodiments, and can be implemented in various other forms without departing from the gist of the disclosure. Therefore, the aforementioned embodiments are merely illustrative in all respects, and are not to be interpreted restrictively. For example, each processing step described above can be selectively changed in order or can be executed in parallel unless the processing contents conflict with each other.

In the specification, the terms "unit" and "section" can be interpreted as physical configurations and also include a case where processing executed by the "unit" or "section" is realized by software. The processing executed by one "unit" or "section" may be realized by two or more physical configurations or apparatuses, alternatively, the processing executed by two or more "units" or "sections" may be realized by single physical means or an apparatus. In the embodiment, the car navigation apparatus is exemplified as the vehicle information communication apparatus 100; however, the embodiment is applicable to various electronic apparatus (for example, a tablet terminal, a smartphone, a portable information terminal and the like) installed in the vehicle.

In the embodiment described above, three types of upload conditions are defined for each analysis viewpoint (refer to FIG. 4B); however, the number of types of upload conditions to be defined is freely selectable. The number or the contents of the upload conditions may be changed, as a matter of course, for each analysis viewpoint.

The program for implementing each processing described in the specification may be stored in a recording medium. By using the recording medium, the program can be installed in a computer constituting the information center 200. Here, the recording medium storing the program may be a non-transitory recording medium. The non-transitory recording medium is not particularly limited, and may be a recording medium, for example, a CD-ROM.

What is claimed is:

1. An information management apparatus comprising:
    a memory which is configured to store vehicle information;
    a plurality of analysis viewpoints which are set in a processing circuitry, wherein
    the processing circuitry is configured to
    receive the vehicle information and to store the vehicle information in the memory, the vehicle information including vehicle identification information uploaded from each of a plurality of vehicles managed by the information management apparatus,
    analyze the vehicle information stored in the memory according to at least one of the set plurality of analysis viewpoints, and
    change an upload condition of the vehicle information based on an analysis result of the vehicle information; and
    a transmitter configured to transmit the changed upload condition to a vehicle among the plurality of vehicles,
    wherein the set plurality of analysis viewpoints comprise a viewpoint of analyzing the vehicle information per vehicle type and a viewpoint of analyzing the vehicle information per information item to be uploaded.

2. The information management apparatus according to claim 1, wherein:
    the processing circuitry is configured to specify a vehicle of which the upload condition is to be changed when the upload condition of the vehicle information is changed; and
    the transmitter is configured to transmit the changed upload condition to the vehicle specified by the processing circuitry.

3. The information management apparatus according to claim 1, wherein
    the plurality of analysis viewpoints further include
    a viewpoint of analyzing the vehicle information per area, and
    a viewpoint of analyzing the vehicle information per time slot in which the vehicle information is uploaded.

4. The information management apparatus according to claim 3, wherein:
    a predefined upload condition is set for each of the plurality of analysis viewpoints set in the processing circuitry; and
    the processing circuitry is configured to specify a vehicle of which the upload condition is to be changed when the upload condition is determined to be changed based on the analysis result of the vehicle information.

5. The information management apparatus according to claim 1, wherein the upload condition includes at least one of information on whether the upload is needed or not, and a sampling period of the vehicle information which is to be uploaded.

6. A non-transitory computer-readable recording medium recording a program which is executable by an information management apparatus including a memory which is configured to store vehicle information, when executed by the information management apparatus, the program causing the information management apparatus to realize functions of
    receiving the vehicle information including vehicle identification information uploaded from each of a plurality of vehicles managed by the information management apparatus,
    analyzing the vehicle information stored in the memory according to at least one of set plurality of analysis viewpoints,
    changing an upload condition of the vehicle information based on an analysis result of the analyzing of the vehicle information, and
    transmitting the changed upload condition to a vehicle among the plurality of vehicles,
    wherein the set plurality of analysis viewpoints comprise a viewpoint of analyzing the vehicle information per vehicle type and a viewpoint of analyzing the vehicle information per information item to be uploaded.

7. The non-transitory computer-readable recording medium according to claim 6, wherein when executed by the information management apparatus, the program causes the information management apparatus to realize functions of
    specifying a vehicle of which the upload condition is to be changed, and
    transmitting the changed upload condition to the specified vehicle.

* * * * *